United States Patent
Hefty

(10) Patent No.: US 9,774,677 B2
(45) Date of Patent: Sep. 26, 2017

(54) REMOTE DIRECT MEMORY ACCESS WITH REDUCED LATENCY

(75) Inventor: Mark S. Hefty, Aloha, OR (US)

(73) Assignee: Intel Corporation, Santa Monica, CA (US)

( * ) Notice: Subject to any disclaimer, the term of this patent is extended or adjusted under 35 U.S.C. 154(b) by 177 days.

(21) Appl. No.: 13/996,400

(22) PCT Filed: Apr. 10, 2012

(86) PCT No.: PCT/US2012/032909
§ 371 (c)(1),
(2), (4) Date: Mar. 27, 2014

(87) PCT Pub. No.: WO2013/154541
PCT Pub. Date: Oct. 17, 2013

(65) Prior Publication Data
US 2014/0201306 A1    Jul. 17, 2014

(51) Int. Cl.
G06F 15/16     (2006.01)
H04L 29/08     (2006.01)
G06F 13/28     (2006.01)

(52) U.S. Cl.
CPC .......... *H04L 67/1097* (2013.01); *G06F 13/28* (2013.01)

(58) Field of Classification Search
CPC ................................................. H04L 67/1097
(Continued)

(56) References Cited

U.S. PATENT DOCUMENTS

| 2004/0225720 A1 | 11/2004 | Pinkerton |
| 2005/0132017 A1 | 6/2005 | Biran et al. |

(Continued)

FOREIGN PATENT DOCUMENTS

| CN | 1610325 A | 4/2005 |
| CN | 1731765 A | 2/2006 |
| WO | 2010/149576 A1 | 12/2010 |

OTHER PUBLICATIONS

Office Action received for Korea Patent Application No. 2014-7027304, mailed on Oct. 5, 2015, 2 pages of English translation and 3 pages of Korean Office Action.

(Continued)

*Primary Examiner* — Adnan Mirza
(74) *Attorney, Agent, or Firm* — Grossman, Tucker, Perreault & Pfleger, PLLC

(57) ABSTRACT

The present disclosure provides systems and methods for remote direct memory access (RDMA) with reduced latency. RDMA allows information to be transferred directly between memory buffers in networked devices without the need for substantial processing. While RDMA requires registration/deregistration for buffers that are not already preregistered, RDMA with reduced latency transfers information to intermediate buffers during registration/deregistration, utilizing time that would have ordinarily been wasted waiting for these processes to complete, and reducing the amount of information to transfer while the source buffer is registered. In this way the RDMA transaction may be completed more quickly. RDMA with reduced latency may be employed to expedite various information transactions. For example, RDMA with reduced latency may be utilized to stream information within a device, or may be used to transfer information for an information source external to the device directly to an application buffer.

27 Claims, 9 Drawing Sheets

(58) Field of Classification Search
USPC .......................................................... 709/212
See application file for complete search history.

(56) References Cited

U.S. PATENT DOCUMENTS

| | | | |
|---|---|---|---|
| 2005/0144310 A1 | 6/2005 | Biran et al. | |
| 2007/0041383 A1 | 2/2007 | Banikazemi et al. | |
| 2008/0235409 A1 | 9/2008 | Ryzhykh | |
| 2009/0083392 A1* | 3/2009 | Wong | H04L 67/1097 709/212 |
| 2009/0319701 A1 | 12/2009 | Mehrotra | |
| 2011/0106905 A1* | 5/2011 | Frey | H04L 69/166 709/212 |
| 2014/0207896 A1 | 7/2014 | Hefty | |

OTHER PUBLICATIONS

Ou, Li, et al., "MRRC: An Effective Cache for Fast Memory Registration in RDMA", 2006, 5 pages.
International Search Report and Written Opinion received for PCT Patent Application No. PCT/US2012/032896, mailed Dec. 6, 2012, 9 pages.
International Search Report and Written Opinion received for PCT Patent Application No. PCT/US2012/032909, mailed Aug. 9, 2013, 11 pages.
International Preliminary Report on Patentability and Written Opinion received for PCT Patent Application No. PCT/US2012/032909, mailed on Oct. 23, 2014, 8 pages.
International Preliminary Report on Patentability and Written Opinion received for PCT Patent Application No. PCT/US2012/032896, mailed on Oct. 23, 2014, 6 pages.
Office Action received for China Patent Application No. 201280071890.4, mailed on Jun. 1, 2016, 5 pages of English translation and 11 pages of Korean Office Action.
Office Action received for Korea Patent Application No. 2014-7027304, mailed on Apr. 6, 2016, 3 pages of English translation and 4 pages of Korean Office Action.
Office Action received for Chinese Patent Application No. 201280071890.4, mailed on Dec. 19, 2016, 5 pages of English translation and 14 pages of Chinese Office Action.
Chinese Office Action issued in Chinese Application No. 201280071890.4, dated Jun. 22, 2017, with English machine translation, 8 pages.

* cited by examiner

REMOTE DIRECT MEMORY ACCESS WITH REDUCED LATENCY

CROSS-REFERENCE TO RELATED APPLICATIONS

This application is related to PCT Application No. PCT/US2012/032896 entitled, "Continuous Information Transfer with Reduced Latency" filed contemporaneously herewith, the disclosure of which is incorporated in its entirety herein by reference.

FIELD

The following disclosure relates to information transfers between computing devices, and more particularly, to information transfers via remote direct memory access with low latency.

BACKGROUND

Applications executing on a computing device may rely upon processing resources in the computing device such as, for example, the operating system kernel to interact with information sources that reside on a network. Kernels are processing engines that form a bridge between the applications and the actual data processing done at the hardware level in a computing system. In this role, the operating system kernel may interact with hardware-level resources such as network interface circuitry to cause information to be transmitted to, or received from, network resources. While allowing for network interaction, performance can be greatly affected by the activity level of the operating system kernel. Communications received by the network interface circuitry may be delayed in instances where the operating system kernel is busy with other tasks. As a result, other methods have been developed for conveying network information that do not involve the main processing resources of the computing device. Remote Direct Memory Access (RDMA) allows a networked device to place information directly into the memory of another networked device without involving main processing resources (e.g., the operating system kernel). While RDMA allows for substantially increased network throughput with lower latency, some issues still exist. RDMA may operate by, for example, taking information from a memory buffer being used by an application and transferring the information directly to a memory buffer accessible to the network interface circuitry, which may then transmit the information to other devices on the network. However, the operating system kernel may move the contents of the application buffer to virtual memory without warning, and so application memory buffer must first be registered to prevent the contents from being moved during the RDMA transaction, and then deregistered to free up the memory space for use by other system resources. The registration/deregistration of the application memory buffer introduces latency into RDMA that may slow down the speed at which information is transferred, and thus, may negatively impact communication performance.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
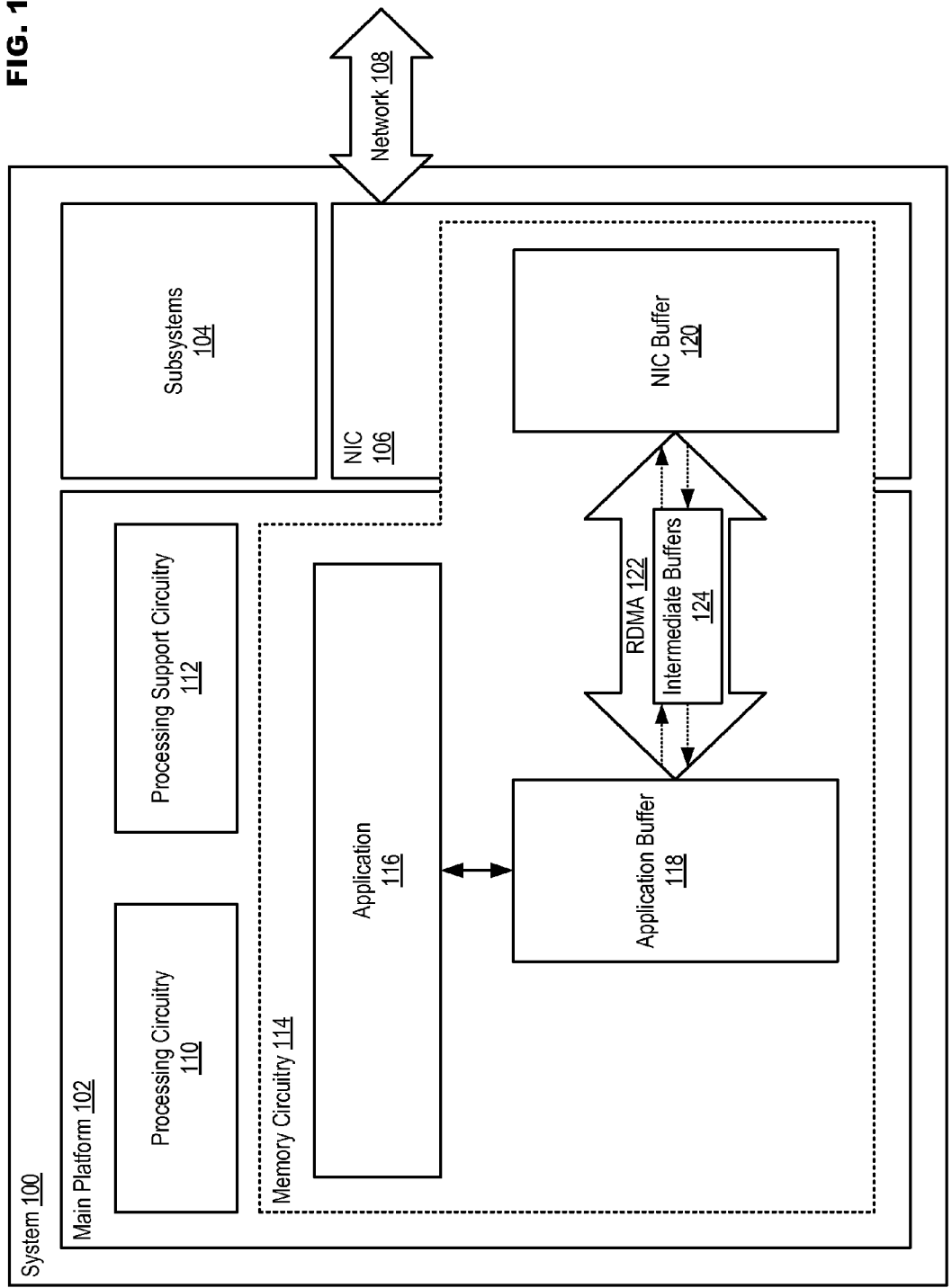
FIG. 1 illustrates an example system configured for remote direct memory access with reduced latency in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure describes systems and methods for remote direct memory access with reduced latency. Generally, in remote direct memory access (RDMA) information residing in one networked device may be transferred directly into the memory of another networked device. RDMA also corresponds to an existing communication protocol that was originally proposed by the RDMA Consortium and the Direct Access Transport (DAT) collaborative, and has since been incorporated into high performance networking architectures such as, for example, InfiniBand™ and iWARP. While aspects of the existing RDMA communication protocol may be referenced herein for the sake of explanation when describing the disclosed embodiments, implementation of these embodiments is not limited to using existing RDMA communication protocol, and may be employed in any existing or emerging communication system that allows a networked device to transfer information directly into the memory of another networked device.

In one embodiment, an application buffer may be configured to cause information to be transferred directly to a network interface circuitry (NIC) buffer, or alternatively, a NIC buffer may be configured to cause information to be transferred to an application buffer without the involvement of processing circuitry (e.g., operating system kernel) in a device. However, the operating system kernel may be configured to, in the course of normal device operation, try to move the contents of the application buffer to another location (e.g., virtual memory) to free up physical memory resources for other device activities. Moving the contents of the application buffer before the transfer is completed would corrupt the transfer. The application buffer must then be registered to prevent the contents from being moved, and must be deregistered after the transfer is complete in order to free up the memory space for dynamic reallocation. Registration and/or deregistration of the memory space takes time, and may introduce latency into RDMA. However, this latency may be avoided by conducting other processes during registration and/or deregistration. "Overlapping" these tasks allows the overall transfer process to finish sooner.

For example, a source buffer (e.g., application buffer) may desire to transfer information to a target buffer (e.g., NIC buffer). The source buffer may be configured to copy information to an intermediate buffer during registration, and the intermediate buffer may be configured to then transmit the information it receives from the source buffer to the target buffer. As a result, the source buffer does not have to wait for registration to complete to start the information transfer, and the amount of information to transfer after registration is complete is reduced. In one embodiment the amount of information to transfer during registration may be experimentally determined based on, for example, the duration of registration. For example, information may be transferred from the source buffer to the intermediate buffer in blocks of increasing size until a default registration offset is achieved, or while registration continues. Upon receipt of complete information blocks the intermediate buffer may transfer the complete blocks to the target buffer. When registration is complete, the source buffer may transfer the remainder of the information (e.g., not already transferred to the intermediate buffer) directly to the target buffer via RDMA.

In the same or a different embodiment, after registration completes the source buffer may be configured to start transferring information to another intermediate buffer to help reduce the latency caused by deregistration. For example, information offset from near the bottom of the source buffer content (e.g., based on predicted deregistration duration) may be transferred to the other intermediate buffer while the source buffer is registered. Thus, the amount of information to transfer while the source buffer is registered is reduced by the offset amount, which reduces the duration of the transfer. Deregistration may commence immediately after completion of the transfer of the information from the registered source buffer, and the information transferred to the other intermediate buffer may be transferred to the target buffer during deregistration. As a result, the source buffer is configured to transfer information to the target buffer during both registration and deregistration, reducing the amount of information to be transferred while the source buffer is registered, and reducing latency as compared to existing RDMA transactions.

In the same or a different embodiment, RDMA with reduced latency may be employed in creating a continuous direct transfer of information (e.g., streaming of information) to or from a networked device. For example, an application buffer and NIC buffer may be configured to expose local buffers for RDMA communication. The application buffer may then be configured to transfer address information (e.g., scatter-gather list entries) into the local buffer of the NIC buffer, and likewise, the NIC buffer may be configured to transfer address information into the local buffer of the application buffer. When either buffer desires to transfer information to the other buffer (e.g., the application buffer desires to transfer information to the NIC buffer), the source (e.g., application) buffer may access its local buffer to determine at least one address corresponding to available memory in the target (e.g., NIC) buffer. If there are no addresses in the local buffer (e.g., no address information at all, all of the addresses have been used, etc.), the source buffer may monitor a completion queue associated with the local buffer for an indication that new information has been written to the local buffer. Following the indication that new information has been written to the local buffer, the source buffer may access the local buffer to retrieve at least one address corresponding to an available memory location in the target buffer.

Further to the above embodiment, the source buffer may also be configured to determine a method by which the information is to be transferred to the target buffer. Where the existing RDMA protocol is being employed, an inline data transfer method may be utilized to transfer small amounts of data without having to register the application buffer. If a larger amount of data is to be transferred (e.g., an amount of data that is greater than a certain or predetermined amount), an RDMA with reduced latency transfer method, such as previously described, may be employed. The source buffer may then be configured to cause the data to be transferred to the target buffer based on the addresses of available memory locations and the determined transfer method. In this manner information may be continuously transferred to open memory locations in the target buffer with little or no latency caused by the determination of available memory locations for the information, registration, deregistration, etc.

In the same or a different embodiment, information may be transferred directly from an information source external to the device (e.g., residing on the network) to the application buffer without have to first be stored in the NIC buffer as required in existing RDMA transactions. For example, an address buffer may include application buffer address information (e.g., scatter-gather list entries) that the external source may use for transferring information directly to the application buffer. The external source may then be configured to check the address buffer to determine if addresses associated with available memory locations in the application buffer are available. If addresses for available memory locations in the application buffer are determined to be available, the outside source may use these addresses to transfer information directly to the application buffer. If no addresses are determined to be available (e.g., the address buffer is empty, all of the addresses in the address buffer have been used, etc.), the external source may begin transferring information to the NIC buffer as in existing RDMA transactions. However, the external source may also be configured to continue checking the address buffer to determine if memory locations become available for transferring information directly to the application buffer. If memory locations do become available, the outside source may begin transferring information directly to the application buffer. In one embodiment, the information transferred directly to the application buffer may include a sequence number indicating that it follows information already transferred to the NIC buffer. As a result, latency may be further reduced.

FIG. 1 illustrates example system 100 configured for RDMA with reduced latency in accordance with at least one embodiment of the present disclosure. System 100 may include a single device, or a multiple devices forming a system, configured to at least process information and to communicate on a network. Examples of system 100 may include, but are not limited to, a mobile communication device such as cellular handset or a smartphone based on the Android® operating system (OS), iOS®, Blackberry® OS, Palm® OS, Symbian® OS, etc., a mobile computing device such as a tablet computer like an Ipad®, Galaxy Tab®, Kindle Fire®, etc., an Ultrabook® including a low-power chipset manufactured by Intel Corp., a netbook, a notebook computer, a laptop computer, etc. Examples of system 100 may also include typically stationary devices such as, for example, a desktop computer with an integrated or separate display, etc.

System 100 may comprise, for example, main platform 102, subsystems 104 and network interface circuitry (NIC) 106. Main platform 102 may include the more substantial information processing resources for system 100. For example, main platform 102 may be configured to orchestrate the functions that may occur during the normal operation of system 100. Subsystems 104 may include circuitry in system 100 configured to, for example, provide other functionality in system 100 such as video input/output, audio input/output, user interfaces, etc. NIC 106 may include physical layer communication resources that may be configured to support interactivity between system 100 and other devices residing on various wired or wireless networks 108.

Main platform 102 may comprise, for example, processing circuitry 110, processing support circuitry 112 and memory circuitry 114. Processing circuitry 110 may include one or more processors situated in separate components, or alternatively, may comprise one or more processing cores in a single component (e.g., in a System-on-a-Chip (SOC) configuration). Example processors may include various X86-based microprocessors available from the Intel Corporation including those in the Pentium, Xeon, Itanium, Celeron, Atom, Core i-series product families. Processing circuitry 110 may be configured to communicate with other circuitry in system 100 using processing support circuitry 112. Processing support circuitry 112 may include a core logic chipset for supporting processing circuitry 110 that includes, for example, memory controllers, graphic controllers, bus controllers, etc. Processing circuitry 110 may interact with other circuitry in system 100, such as subsystems 104 and NIC 106, through processing support circuitry 112. While processing support circuitry 112 may be embodied as chipset including two or more separate integrated circuits (ICs) such as, for example, the Northbridge and Southbridge chipsets manufactured by Intel Corporation, some or all of the functionality that is typically included in processing support circuitry 112 may also be found in processing circuitry 110.

Processing circuitry 110 may be configured to execute instructions. Instructions include program code that, when executed, causes processing circuitry 108 to perform functions such as, for example, reading (accessing) data, writing (storing) data, processing data, formulating data, generating data, converting data, transforming data, etc. Information (e.g., instructions, data, etc.) may be stored in memory circuitry 114. Memory circuitry 114 may comprise random access memory (RAM) and/or read-only memory (ROM) in a fixed or removable format. RAM may include memory configured to hold information during the operation of system 100 such as, for example, static RAM (SRAM) or Dynamic RAM (DRAM). ROM such as, for example, bios memory may be configured to provide instructions when system 100 activates. Other examples of ROM include programmable memory such as electronic programmable ROM, (EPROM), Flash, etc. Other embodiments of fixed and/or removable memory include magnetic memories such as floppy disks, hard drives, etc., electronic memories such as solid state flash memory (e.g., eMMC, etc.), removable memory cards or sticks (e.g., uSD, USB, etc.), optical memories such as compact disc-based ROM (CD-ROM), holographic memory, etc.

In one embodiment, at least one application 116 may be configured to execute in memory circuitry 114 of system 100. For example application 116 may be part of the operating system of system 100 (e.g., a service), may be executed automatically by system 100, may be executed by a user of system 100, etc. Application 116 may be configured to support the operation of system 100, to provide user-desired functionality (e.g., communications, entertainment, productivity, navigation, etc.), to provide information to an external information consumer (e.g., a device on network 108), etc. During execution, application 116 may require space in memory circuitry 114 to store information (e.g., application buffer 118). For example, in instances where application 116 is configured to interact with devices residing on network 108, application buffer 118 may store information to be transmitted out to network 108 via NIC 106, or alternatively, information received from network 108 via NIC 106. NIC buffer 120 may be configured to receive and store information from system 100 (e.g., from application 118) for transmission on network 108, or to receive information from network 108 for consumers (e.g., application 118) in system 100.

Prior to RDMA 122, main platform processing resources (e.g., processing circuitry 110 and/or processing support circuitry 112) would be required to transfer information from buffer 120 to buffer 118 (e.g., for use by application 116), and to transfer information from buffer 118 to buffer 120 (e.g., for transmission to network 108). Transferring information in this manner allows information to be conveyed between buffers 118 and 120, but may be subject to systemic limitations. For example, it is possible for processing circuitry 110 and/or processing support circuitry 112 to become busy handling other tasks in system 100, and therefore, the transfer of information between buffer 118 and 120 may be delayed, which may in turn cause a delay in the execution of application 116 and may adversely impact the performance of system 100. RDMA 122 helps to alleviate this situation by conveying information directly between buffers 118 and 120 without involving main platform processing resources. However, existing RDMA protocol also comes with some limitations. The main platform processing resources may unpredictably move the content of physical memory to virtual memory (e.g., permanent storage that simulates physical memory in order to reduce the amount of physical memory required for system 100) to free up resources for other activities in system 100. Moving the contents of application buffer 118 to virtual memory during an information transfer would result in incorrect information being transferred, and thus, the transfer being corrupted. To prevent the contents of application buffer 118 from being moved, application buffer 118 must first be registered before the existing RDMA protocol can transfer the information. The buffer must then be deregistered after the transfer is complete to again make the memory being used by application buffer 118 available for dynamic reallocation. This requirement may not apply to NIC buffer 120 as it may be preregistered (e.g., may be permanently registered to NIC 106 from the activation of system 100). Registration and deregistration are orchestrated by the main platform processing resources of system 100, which again subjects the RDMA transaction to potential delays due to processing circuitry 110 and/or processing support circuitry 112 being busy with other activities in system 100.

Figure 2:
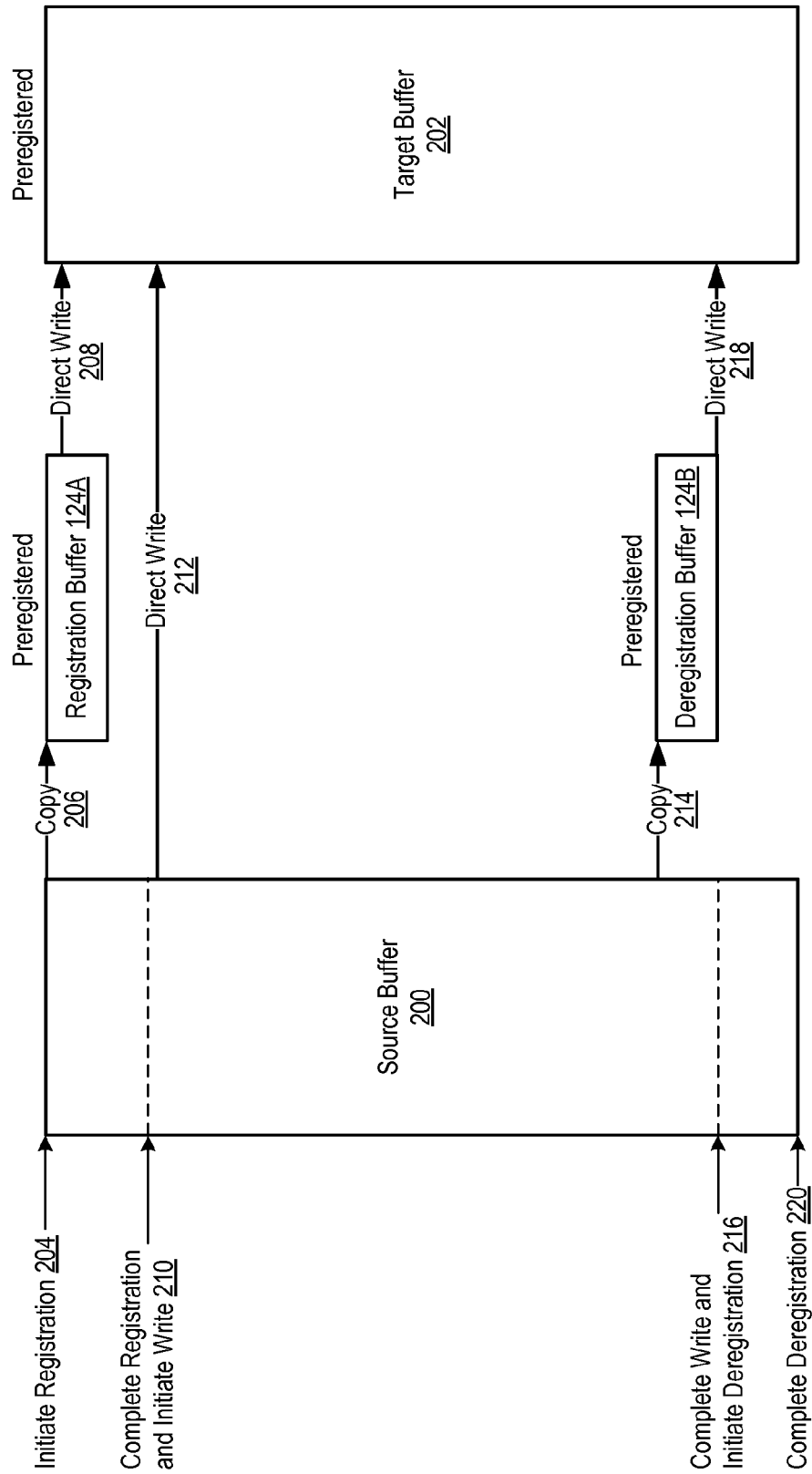
FIG. 2 illustrates an example information transfer using remote direct memory access with reduced latency in accordance with at least one embodiment of the present disclosure.

In one embodiment, operation of RDMA 122 may be enhanced through the use of one or more intermediate buffers 124. For example, information may be transferred from a "source" buffer (e.g., application buffer 118) directly to intermediate buffers 124 during registration and deregistration, eliminating some or all of the latency caused by these operations. In this manner, time where the source buffer would have ordinarily been idle waiting for registration to complete may be used to transfer information, and the amount of information to transfer while the source buffer is registered is reduced. FIG. 2 illustrates an example information transfer using RDMA with reduced latency in accordance with at least one embodiment of the present disclosure. In the example of FIG. 2, source buffer 200 is attempting to transfer information to target buffer 202. Source buffer 200 (e.g., application buffer 118) is not preregistered, and therefore must be registered to maintain the integrity of its contents in memory circuitry 114 for the duration of the transfer. Target buffer 202 (e.g., NIC buffer 120) is preregistered. Registration for source buffer 200 initiates at 204. At the same time or soon thereafter, source buffer 200 may be configured to start copying information to an intermediate buffer (e.g., registration buffer 124A) as shown at 206. Registration buffer 124A may be a preregistered buffer configured to receive information from source buffer 200 and to transfer information to target buffer 202. Registration buffer may have a set size such as, for example, 16 Kb, or may have a variable size that may be determined during operation based on, for example, the amount of time it takes to register source buffer 200. For example, registration may take longer if main platform 102 is busy with other tasks, and as a result, the size of registration buffer 124A may be increased to receive more information from source buffer 200. The size of registration buffer 124A does not have to equal the total amount of information that will be transferred during registration since, in one embodiment, registration buffer 124A may be configured to constantly transfer out information as it is received, and thus, there is never an instance where it retains all of the information transferred during registration.

Source buffer 200 may be configured to continue transferring information to registration buffer 124A until a certain threshold is reached. For example, information may be transferred to registration buffer 124A until an offset is reached based on the amount of information to transfer, until a certain memory address is reached, while registration continues, etc. In one embodiment, registration buffer 124A may be configured to write information received from source buffer directly to target buffer 208 via RDMA. For example, registration buffer 124A may issue one or more RDMA_post_write commands to target buffer 202 to cause information received from source buffer 200 to be transferred directly to target buffer 202. An example methodology by which source buffer 200 may transfer information to registration buffer 124A, and registration buffer 124A may transfer information to target buffer 202, is described in detail in FIG. 3.

Registration may complete at 210, and at the same time or soon thereafter source buffer 200 may be configured to cause information to be transferred from source buffer 200 directly to target buffer 200 as shown at 212. For example, source buffer 200 may issue an RDMA write command to target buffer 202 causing information to be transferred from now registered source buffer 200 directly to target buffer 202. In the same or a different embodiment, at the same time or soon after RDMA write command 212 is issued, source buffer 200 may also be configured to begin copying information from near the bottom of source buffer 200 to another intermediate buffer (e.g., deregistration buffer 124B) as shown at 214. The starting address and amount of information transferred to deregistration buffer 124B may be based on, for example, a size or offset that may be determined based on the predicted time that it will take for source buffer 200 to complete deregistration. At 216 the transfer of information that was initiated at 212 may be complete, and deregistration may initiate. Deregistration buffer 124B may then be configured to transfer the information it received from source buffer 200 to target buffer 202 as shown at 218. For example, deregistration buffer 124A may issue one or more RDMA_post_write commands to target buffer 202 to cause information received from source buffer 200 to be transferred directly to target buffer 202. An example methodology by which source buffer 200 may transfer information to deregistration buffer 124B, and deregistration buffer 124B may transfer information to target buffer 202, is described in detail in FIG. 4.

Figure 3:
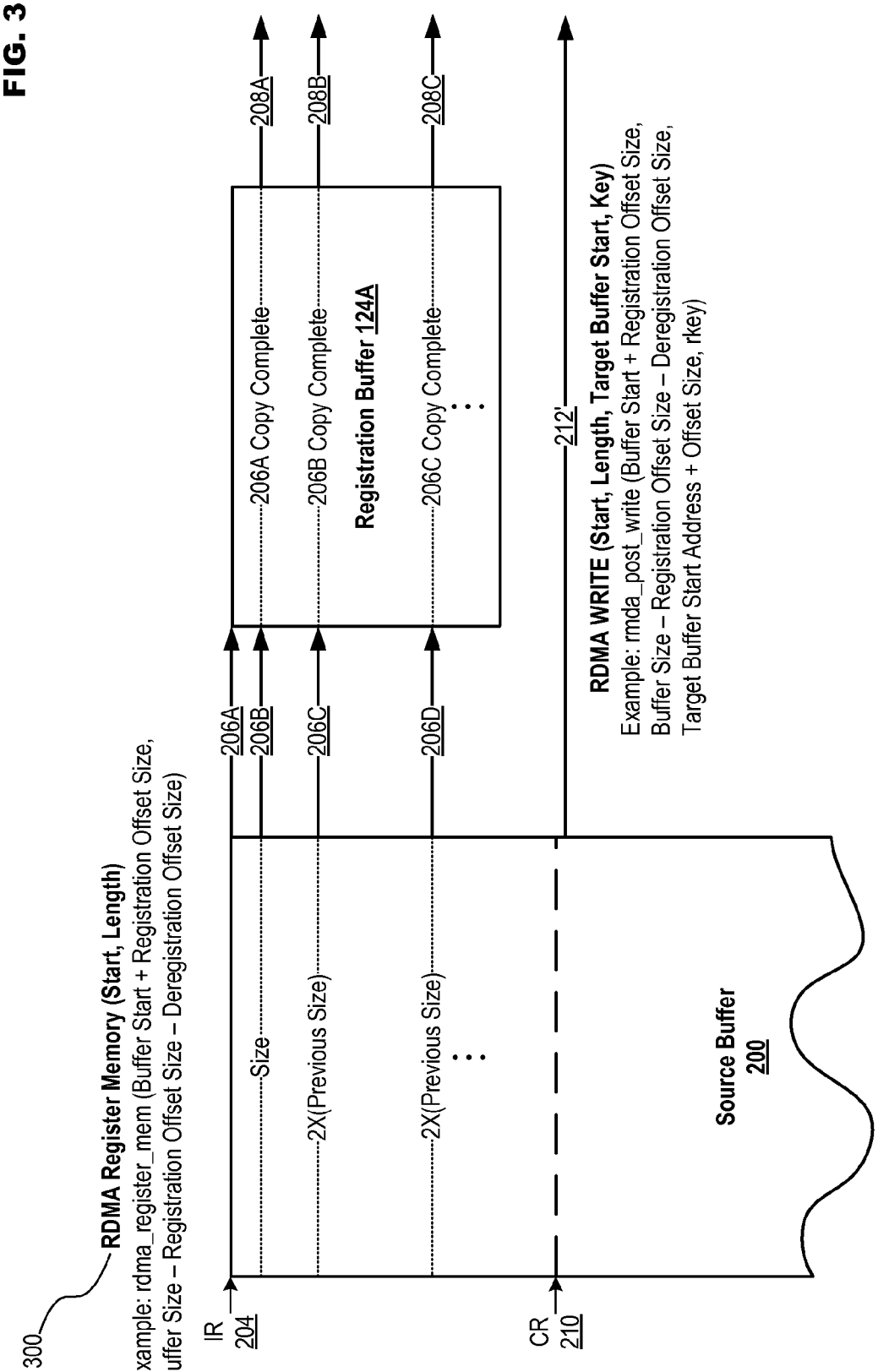
FIG. 3 illustrates an example of registration during remote direct memory access with reduced latency in accordance with at least one embodiment of the present disclosure.

FIG. 3 illustrates an example of registration during RDMA with reduced latency in accordance with at least one embodiment of the present disclosure. Registration is initiated (e.g., "IR") at 204. An example initiate command is disclosed at 300. The command may be deemed "asynchronous" in that it does not need to occur prior to transferring information. The command may be an RDMA register memory command that includes the start address and length of the memory to be registered. For example, the start of the memory to be registered may be the start of the buffer plus a registration offset size. The registration offset size may indicate the amount of data to be written to registration buffer 124A during registration. The length of the memory to be registered may be the size of source buffer 200 from which is subtracted the registration offset size and, if transfer will occur during deregistration, the deregistration offset size. For example, the amount of information to be registered may be the information in source buffer 200 between dotted lines 210 and 216 in FIG. 2. The registration offset size may be empirically determined as shown in 206A-D. A predetermined initial block size may be copied from source buffer 200 to registration buffer 124A at 206A. When transfer of the block is complete at 206B, the block may be transferred out of registration buffer 124A as shown at 208A. Blocks of information may continue be copied to registration buffer 124A while the amount of information transferred to registration buffer 124A is below a maximum offset, or while registration is not complete. In one embodiment, each block of information transferred (e.g., 206C, 206D, etc.) may increase in size (e.g., double), and may be transferred out of registration buffer 124A as soon as reception is complete (e.g., 208B, 208C, etc). Example pseudo-code that describes an embodiment of these operations is as follows:

```
size = Initial_Size
while (offset < registration_offset) or (registration is not complete) {
    copy (registration_buffer + offset, source_buffer + offset, size)
    rdma_post_write (registration_buffer + offset, size,
        target_buffer + offset, size, rkey)
    offset = offset +size
    size=size x 2
}
registration_offset = offset
```

Wherein "Initial_Size" is an initial block size that may be predetermined in system 100, "registration_offset" is a maximum size of the offset allowed to be copied during registration, "registration_buffer" is the starting address of registration buffer 124A, "offset" is a cumulative amount of information copied to the registration buffer, "source_buffer" is the starting address of the source buffer, "size" is the current information block size being transferred, "target_buffer" is starting address of target buffer 202 and "rkey" is a security key used to access target buffer 202. In the above example pseudocode, upon termination of the copying loop the registration offset size is set as the offset size resulting from the copying loop (registration_offset=offset), thus empirically establishing an appropriate registration offset size. For example, if system 100 is busy registration will take longer, and the copying loop will most likely terminate when the maximum amount of information is moved (e.g., offset≥registration_offset). In such instance the registration offset would not change since "offset" would be equal to the current registration offset. However, registration may proceed quickly if system 100 is not busy, and the copying loop will then most likely terminate at the end of registration (e.g., registration is complete), and the size of the registration offset would be set equal to the amount of information moved during registration. In this manner, the amount of data moved during registration may be indicative of the current condition of system 100. The updated registration offset size may cause system 100 to, for example, adjust the size of the initial information block (e.g., Initial_size), adjust the size of registration buffer 142A, adjust the size of the deregistration offset and/or buffer 142B, etc.

After registration is complete (e.g., "CR") at 240, an RDMA command may be issued at 212' to cause the information that has not already been transferred to registration buffer 124A to be transferred directly to target buffer 202, and may also account for any information that will be transferred during deregistration. RDMA write command 212' may include, for example, source buffer start address, length, target buffer start address and access key as parameters. In the example rdma_post_write command illustrated in FIG. 3, the source buffer start address may be the actual start of the buffer including the registration offset size (e.g., the amount of information already transferred to registration buffer). The length is the buffer size of source buffer 200 from which is subtracted the registration offset size and the deregistration offset size (e.g., the amount of information that will be transferred during deregistration). The target buffer start address is the actual starting address of the target buffer plus the registration offset size (e.g., to avoid writing over the information that was previously transferred during registration), and rkey is a security key that allows source buffer 200 to transfer information directly to target buffer 202.

Figure 4:
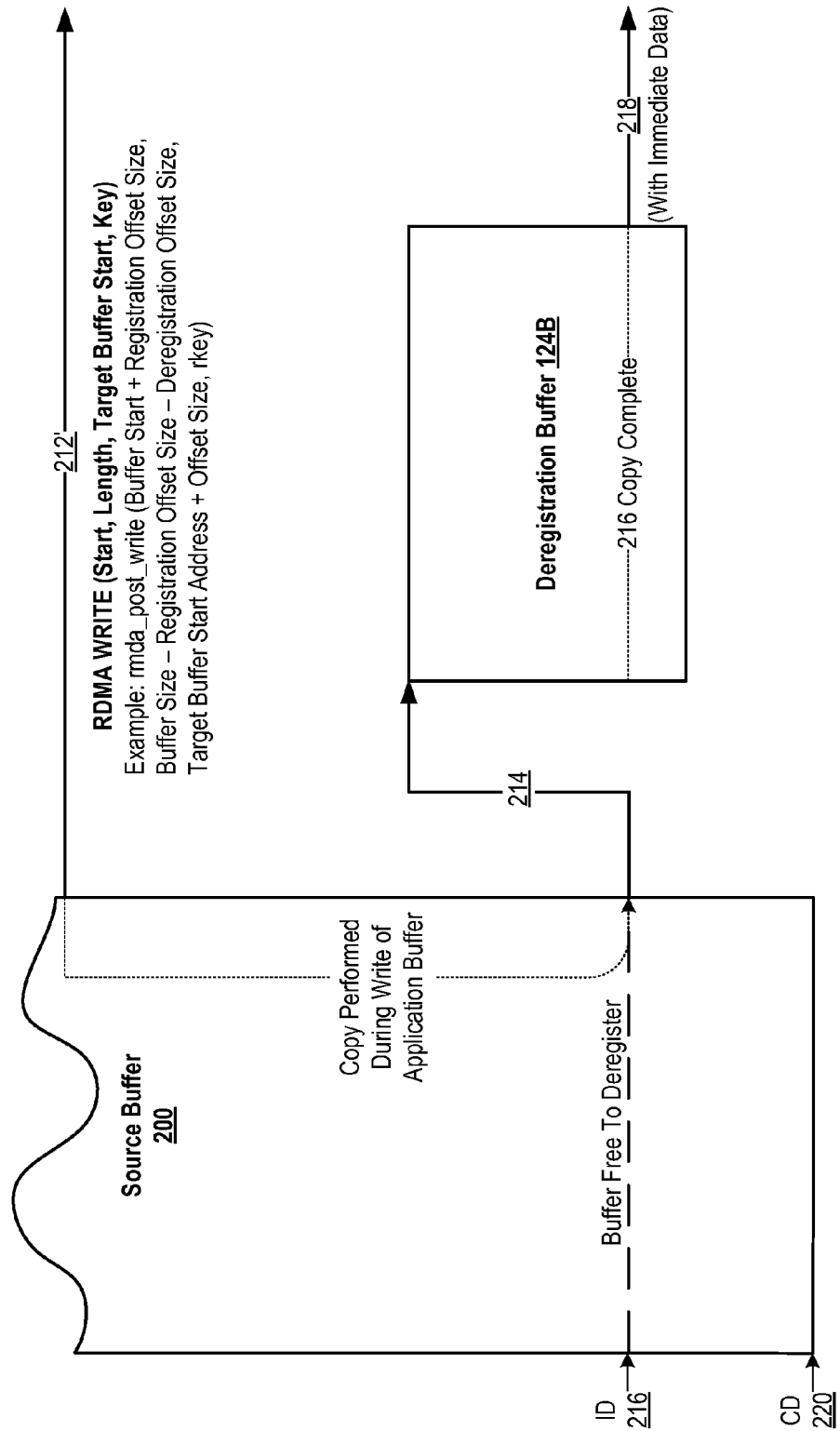
FIG. 4 illustrates an example of deregistration during remote direct memory access with reduced latency in accordance with at least one embodiment of the present disclosure.

FIG. 4 illustrates an example of deregistration during RDMA with reduced latency in accordance with at least one embodiment of the present disclosure. At the same time or soon after RDMA write command 212' is issued, source buffer 200 may also be configured to begin copying information from near the bottom of the buffer to deregistration buffer 124B as shown at 214. At least one advantage of copying information to deregistration buffer 124B is that less information is required to be transferred while source buffer 200 is registered (e.g., the buffer size−registration offset−the deregistration offset). As a result, deregistration may start more quickly and the memory (e.g., memory circuitry 114) occupied by source buffer 200 may be made available for dynamic reallocation more quickly. In one embodiment, information may be copied to deregistration buffer 124B as shown at 214 while RDMA write 212' is ongoing, with copying 214 to be completed at approximately the same time that RDMA write 212' is complete. The deregistration of source buffer 200 may then initiate (e.g., "ID") as shown at 216 (e.g., since all of the information has been transferred from source buffer 200), and at the same time or soon thereafter deregistration buffer 124B may cause the information received from source buffer 200 to be transferred (e.g., to target buffer 202) as shown at 218. For example, deregistration buffer 124B may issue an RDMA_post_write command to target buffer 202 to cause information received from source buffer 200 to be transferred directly to target buffer 202. The transfer at 218 may also include "immediate data." In RDMA, immediate data notifies a receiving buffer that the transfer of information is complete (e.g., that the transferred information may now be accessed). Pseudocode that describes an example embodiment of these operations is as follows:

```
copy (registration_buffer + registration_offset, source_buffer +
source_buffer_length −           deregistration_offset,
                                 deregistration_offset)
    rdma_post_write (registration_buffer + registration_offset,
    deregistration_offset,
        target_buffer +source_buffer_length − deregistration_offset,
        rkey)
    wait_for_completion (rdma write 212')
```

Wherein "deregistration_offset" is the amount of information to be written during deregistration and "source_buffer_length" is the length of source buffer 200. In this manner, the information that will still remain to be transferred in source buffer 200 after RDMA write 212 has been completed (e.g., source_buffer+source_buffer_length−deregistration_offset) may be copied to deregistration buffer 124B, and then transferred to target buffer 202 after the write associated with command 212' is complete (e.g., wait_for_completion (rdma write 212').

Figure 5:
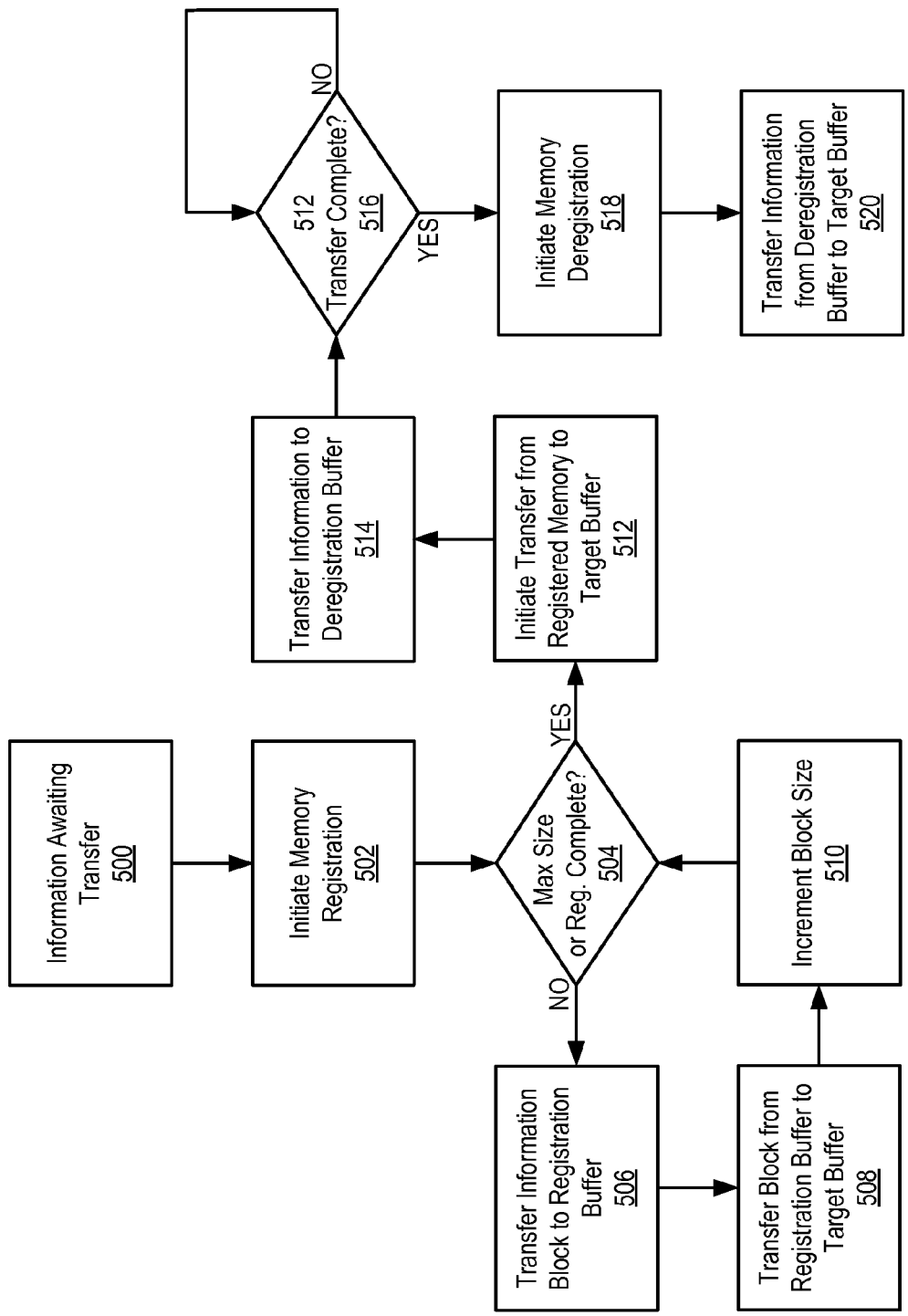
FIG. 5 illustrates a flowchart of example operations for remote direct memory access with reduced latency in accordance with at least one embodiment of the present disclosure.

FIG. 5 illustrates a flowchart of example operations for RDMA with reduced latency in accordance with at least one embodiment of the present disclosure. In operation 500 information in a source buffer may be awaiting transfer to another buffer (e.g., to a target buffer). The source buffer may then initiate memory registration in operation 502. While the amount of information transferred is below a maximum size (e.g., registration offset) or while registration is incomplete as determined in operation 504, in operations 506 to 510 information may be transferred from the source buffer to a registration buffer, and then from the registration buffer to the target buffer. For example, in operation 506 a block of information may be transferred from the source buffer directly to the registration buffer. The transfer may occur by issuing an RDMA write command to the registration buffer, and the initial block size may be predetermined in system 100. Then in operation 508 the information block may be transferred from the registration buffer directly to the target buffer. In operation 510 the block size may be incremented (e.g., the block size may be doubled). When in operation 504 it is determined that the amount of transferred data is at or above the max size, or that registration is complete, then following the completion of registration the information transfer from the registered source buffer directly to the target buffer may be initiated in operation 512, for example, by issuing an RDMA write command to the target buffer.

At the same time as or soon after operation 512 occurs, the transfer of information from the source buffer directly to the deregistration buffer may initiate in operation 514, for example, by issuing an RDMA write command to the deregistration buffer. A determination may then be made in operation 516 as to whether the information transfer initiated in operation 512 is now complete. If the information transfer initiated in operation 512 is determined to be complete, deregistration may then be initiated in operation 518, which may be closely followed by the transfer of information from the deregistration buffer directly to the target buffer in operation 520. The transfer of information from the source buffer to the target buffer may occur by, for example, issuing an RDMA write command to the target buffer.

Example Applications of Remote Direct Memory Access with Reduced Latency

RDMA with Reduced Latency may be employed to reduce the latency seen in accordance with memory registration and deregistration as required in existing RDMA protocol. However, in various embodiments these principles may also be applied to further eliminate other potential sources of latency seen in existing RDMA transactions. In one embodiment, information may be transferred from a source buffer to a target buffer based on address information corresponding to available memory space in the target buffer that is locally available to the source buffer, resulting in a substantially continuous stream of information, or "streaming information." In the same or a different embodiment, an information source external to system 100 may skip the NIC buffer and transfer information directly to an application buffer, further expediting information transfer and removing latency caused by having to communicate via the NIC buffer as in existing RDMA.

Figure 6:
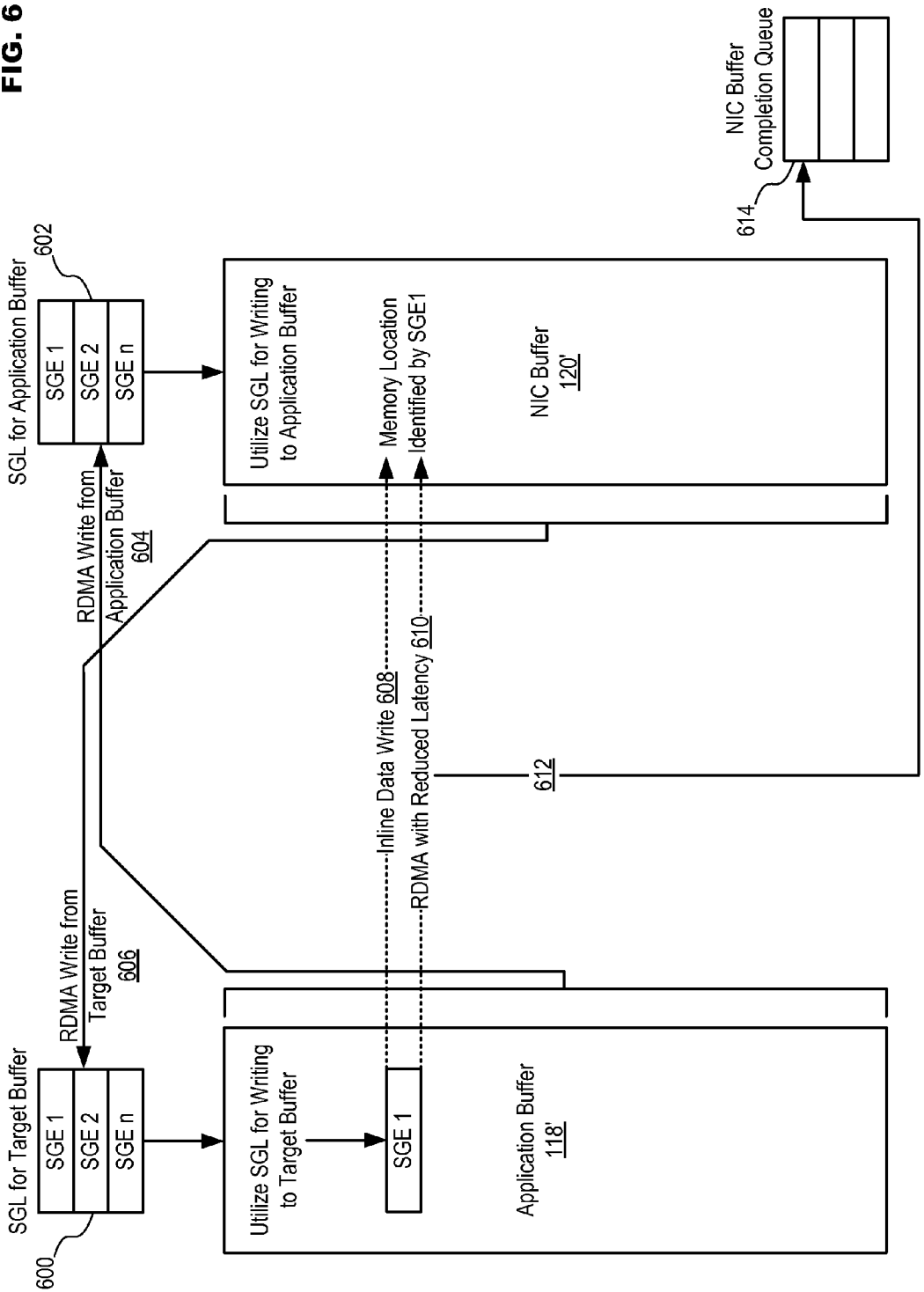
FIG. 6 illustrates an example of using remote direct memory access with reduced latency to stream information in accordance with at least one embodiment of the present disclosure.

FIG. 6 illustrates an example of using RDMA with reduced latency to stream information in accordance with at least one embodiment of the present disclosure. In one embodiment, prior to application buffer 118' transferring information to NIC buffer 120', or conversely, prior to NIC buffer 120' transferring information to application buffer 118', buffer 118' and/or buffer 120' may be configured to expose local buffers 600 and 602 for RDMA writes. For example, application buffer 118' may be configured to write address information (e.g., a scatter-gather list (SGL) comprising one or more scatter-gather entries (SGE) 1 to n) directly into address buffer 602 via RDMA as shown at 604, and NIC buffer 120' may be configured to write address information (e.g., an SGL comprising one or more SGEs 1 to n) directly into address buffer 600 via RDMA as shown at 606. Examples scatter-gather entries may comprise memory location information (e.g., addresses) corresponding to available memory space in each of buffers 118' and 120'.

In an example operation where application buffer 118' has information to transfer to NIC buffer 120', NIC buffer 120' may write an SGL comprising one or more SGEs to address buffer 600 as shown at 606. Application buffer may also write an SGL to address buffer 602 as shown at 604, but it is not necessary for information transfers from application buffer 118' to NIC buffer 120'. Application buffer may then be configured to access address buffer 600 to check for an address corresponding to available memory space in NIC buffer 120'. If no SGEs are available (e.g., the buffer is empty, all of the existing SGEs have been used, etc.) then application buffer 118' may monitor a completion queue associated with address buffer 600 for an indication that address buffer 600 has been updated. In the illustrated example SGE 1 is available, and thus, application buffer 118' may transfer information directly into the memory space in NIC buffer 120' that is identified by SGE 1.

In the same or a different embodiment, Application buffer 118' may then determine a method by which to transfer the information to NIC buffer 120'. For example, if only a small amount of information is to be transferred (e.g., an amount of information less than a certain amount that may be predetermined in system 100), application buffer 118' may be configured to transfer the information using an RDMA inline data write method as shown at 608. The RDMA data inline write command is defined in the existing RDMA protocol and may be employed to transfer small amounts of information without having to first register the source buffer (e.g., application buffer 118'). An example of an RDMA inline data write command that may be employed in accordance with the various disclosed embodiments may be:

rdma_post_write (source_buffer, inline_size, target_buffer_address, rkey, inline_flag)

Wherein "inline_size" is the amount of information to transfer via the RDMA inline data write command and "target_buffer_address" is the address of the available memory space in the target buffer (e.g., NIC buffer 120'). For example, "target_buffer_address" may be determined based on the SGE obtained from address buffer 600. If a larger amount of information is to be transferred (e.g., an amount of information greater than the certain amount), application buffer 118' may be configured to transfer the information using RDMA with reduced latency as shown at 610. Information may be transferred at 610 in accordance with the various embodiments of RDMA with reduced latency that were disclosed herein, for example, in discussion of at least FIGS. 1 to 5. Regardless of whether application buffer 118' uses the inline data write method at 608, or the remote direct memory access with reduced latency at 610, when the information transfer is complete application buffer 118' may further write immediate data to NIC buffer completion queue 614 as shown at 612. The writing of immediate data at 612 informs NIC buffer 120' that the information transfer is complete and that it may access the information. It is important to note that while the example illustrated in FIG. 6 shows the transfer of information from application buffer 118' to NIC buffer 120', this is merely for the sake of explanation herein. It would also be possible for NIC buffer 120' to transfer information to application buffer 118' using similar operations to those previously described in the discussion of FIG. 6.

Figure 7:
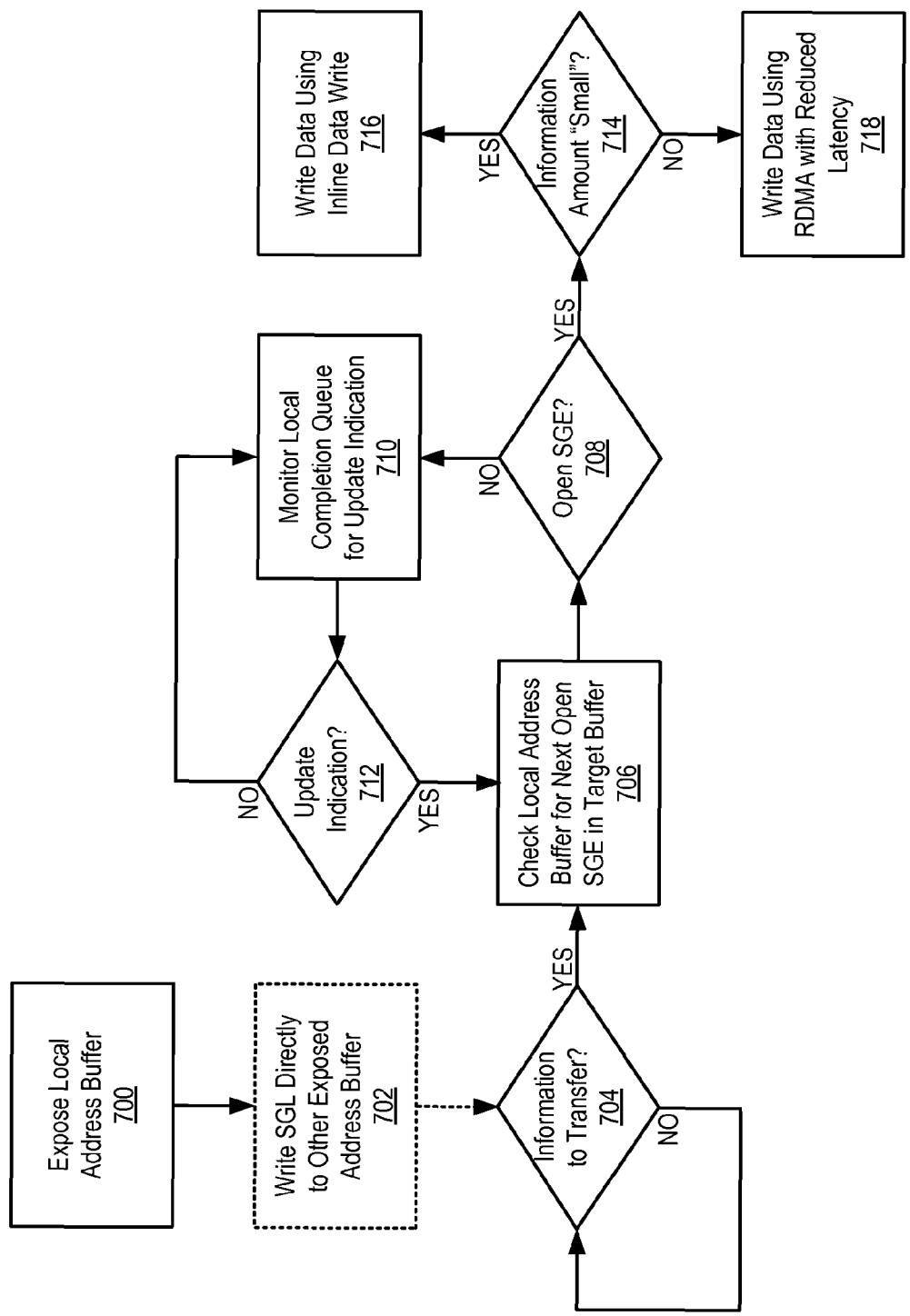
FIG. 7 illustrates a flowchart of example operations for using remote direct memory access with reduced latency to stream information in accordance with at least one embodiment of the present disclosure.

FIG. 7 illustrates a flowchart of example operations for using remote direct memory access with reduced latency to stream information in accordance with at least one embodiment of the present disclosure. In operation 700 a source buffer (e.g., application buffer 118' in the example of FIG. 6) may expose a local address buffer (e.g., so that a target buffer may write address information directly into the local address buffer via RDMA). In operation 702 the source buffer may also write address information (e.g., SGL) directly into the exposed buffer of another buffer (e.g., the target buffer). Operation 702 is optional is that it is not required for the source buffer to transfer information to a target buffer. In operation 704 a determination may then be made as to whether there is information to transfer from the source buffer to the target buffer. If it is determined in operation 704 that there is information to transfer, then in operation 706 the source buffer may check the local address buffer to determine the next usable address (e.g., SGE) corresponding to available memory space in the target buffer. A determination may then be made in operation 708 as to whether at least one SGE is available. If in operation 708 it is determined that no SGEs are available (e.g., the local address buffer is empty, all of the SGEs have been used, etc.), then in operation 710 a completion queue for the local address buffer may be monitored for an update indication. A determination may then be made in operation 712 as to whether an update indication has been received in the completion queue. The completion queue may be monitored until it is determined that an update indication has been received. The receipt of an update indication in the completion queue may cause the source buffer to again check the local address buffer for an SGE that may be used to transfer the information in operation 706.

If a usable SGE is determined to exist in operation 708, then in operation 714 a further determination may be made as to whether a "small" amount of information us to be transferred. For example, in operation 714 the amount of information to be transferred may be compared to a certain amount of data that is predetermined in system 100. If it is determined that the amount of information to transfer is small (e.g., below the certain amount) then the information may be transferred via the RDMA inline data write method in operation 716. Otherwise, in operation 718 the information may be transferred using RDMA with reduced latency.

Figure 8:
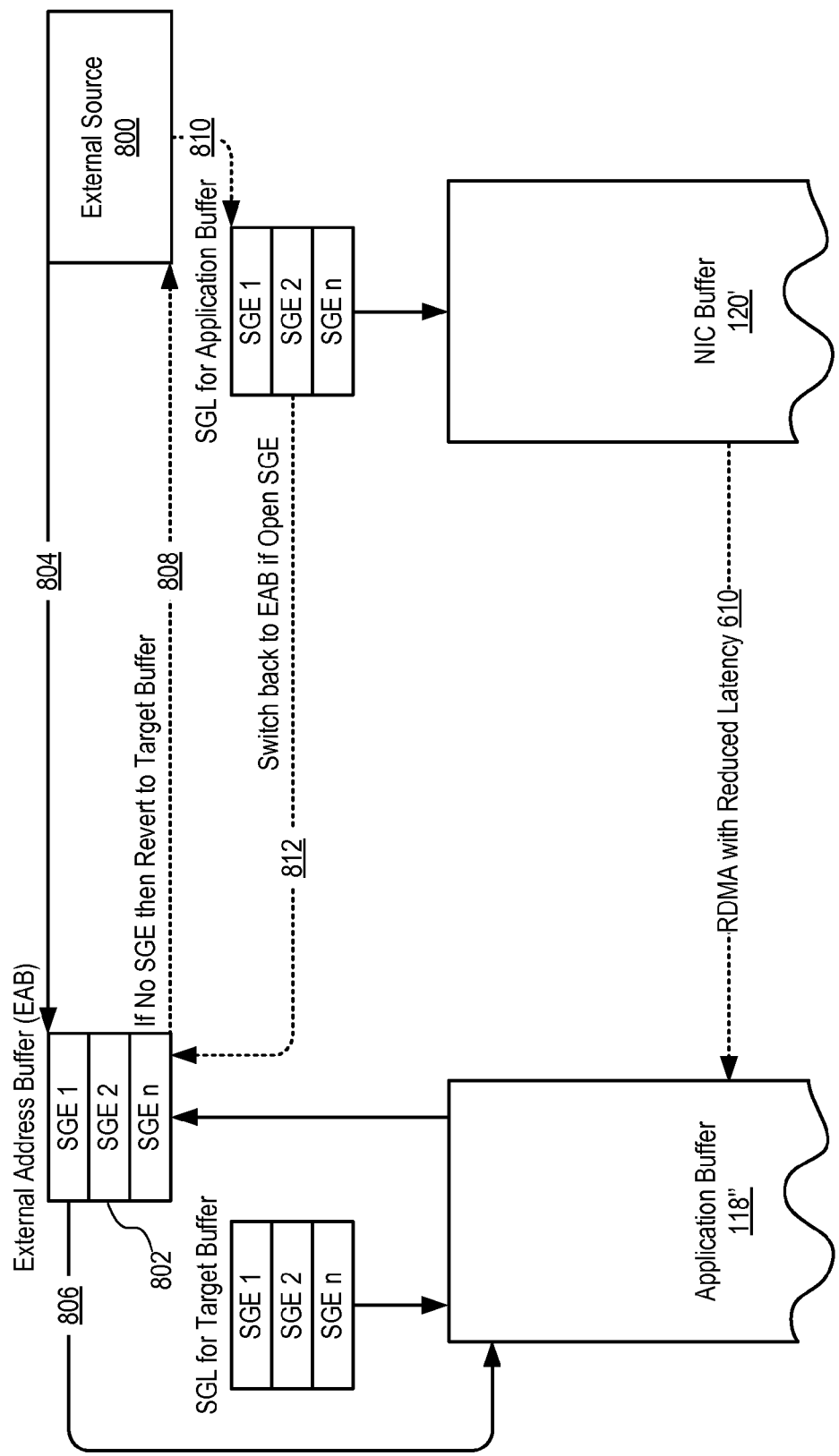
FIG. 8 illustrates an example of an external source transferring information directly to an application buffer using remote direct memory access with reduced latency in accordance with at least one embodiment of the present disclosure.

FIG. 8 illustrates an example of an external information source transferring information directly to an application buffer using RDMA with reduced latency in accordance with at least one embodiment of the present disclosure. External information source 800 (e.g., a device on network 108) may desire to transfer information to application buffer 118" in system 100. In the existing RDMA protocol the information would first have to be transferred to NIC buffer 120', which would in turn transfer the information to application buffer 118". However, in at least one application of RDMA with reduced latency it may be possible for external information source 800 to transfer information directly to application buffer 118", skipping NIC buffer 120' and resulting in a substantial latency reduction for the information transfer. In one embodiment, external address buffer (EAB) 802 may be associated with application buffer 118" and may be accessible to external information source 800. EAB 802 may be employed to inform external information source 800 of address information (e.g., SGEs 1 to n) corresponding to available memory space in application buffer 118" into which information may be directly transferred. Initially, application buffer 118" may be configured to provide address information (e.g., SGEs 1 to n) to EAB 802. External information source 800 may be configured to check EAB 802 for address information (e.g., at least one SGE) corresponding to available memory space as shown at 804. If at least one SGE is available (e.g., SGE 1), then external information source 800 may begin transferring information directly into application buffer 118" as shown at 806.

However, if after checking EAB 802 external information source 800 determines that no SGEs are available (e.g., EAB 802 is empty, all of the SGEs have been used, etc.) as shown at 808, then external source 800 may be configured to begin transferring information to NIC buffer 120' as shown at 810. NIC buffer 120' may be configured to begin transferring information to application buffer 118" via, for example, RDMA with reduced latency 610. In one embodiment, external information source 800 may be configured to continue checking EAB 802 during the transfer of information to NIC buffer 120' to determine if memory space becomes available in application buffer 118" as shown at 812. For example, information source 800 may monitor a completion queue associated with EAB 802 for an update indication, and upon determining that an update has occurred, may check EAB 802 for available SGEs. If external information source 800 determines that memory space is available in application buffer 118" for direct transfer, then external information source 800 may begin (or resume) transferring data directly to application buffer 118". In one embodiment, all the information transferred from external source 800 may comprise sequence numbers that may be employed in placing the received information into an appropriate order of receipt. For example, if external source 800 transfers some information to NIC buffer 120', and then begins to transfer information to application buffer 118" directly, the information transferred directly to application buffer 118" may include sequence numbers that fall after the sequence numbers assigned to the information first transferred to NIC buffer 120'. In this manner application buffer 118" may be able to reorder information received from the two sources (e.g., external source 800 and NIC buffer 120') into the correct order of receipt.

Figure 9:
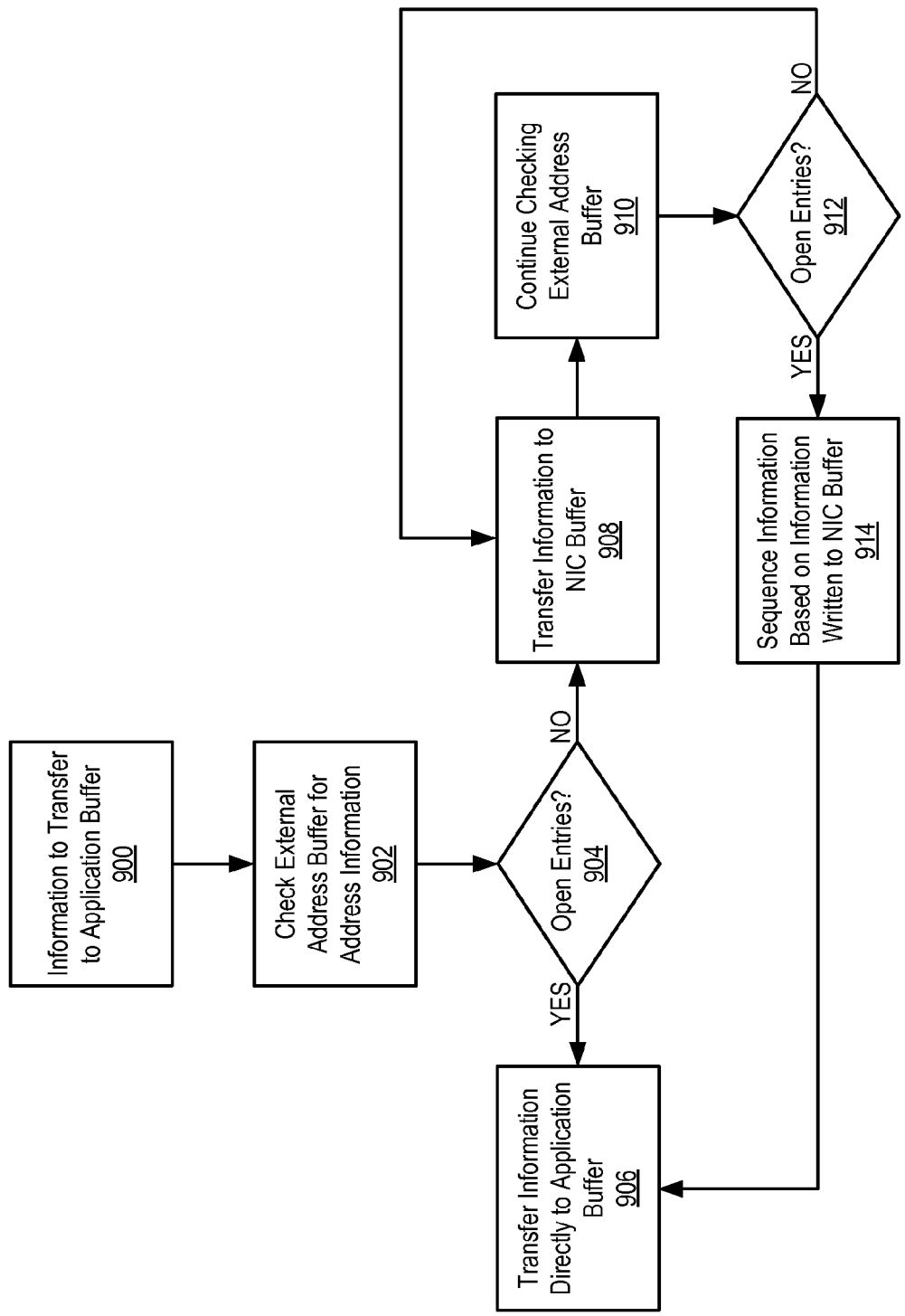
FIG. 9 illustrates a flowchart of example operations for an external information source transferring information directly to an application buffer using remote direct memory access with reduced latency in accordance with at least one embodiment of the present disclosure.

FIG. 9 illustrates a flowchart of example operations for an external information source transferring information directly to an application buffer using RDMA with reduced latency in accordance with at least one embodiment of the present disclosure. In operation 900 an external information source (e.g., a device on network 108) may determine that it has information to transfer to an application buffer. In operation 902 the external information source may check an external address buffer associated with the application buffer to determine if address information (e.g., at least one SGE) corresponding to available memory space in the application buffer into which information may be directly transferred is available. If in operation 904 it is determined that at least one SGE exists corresponding to available address space, then in operation 906 information may be transferred from the external information source directly to the application buffer. Alternatively, if in operation 904 it is determined that no SGEs exist (e.g., the external address buffer is empty, all of the SGEs have been used, etc.), the in operation 908 the external source may start transferring information to a NIC buffer.

While transferring the information to the NIC buffer, the external information source may continue checking the external address buffer for address information corresponding to available memory space in the application buffer in operation 910. For example, the external source may monitor a completion queue associated with the external address buffer for an indication that the external address buffer has been updated. The external information source may continue to transfer information to the NIC buffer until in operation 912 it is determined that at least one SGE exists corresponding to available memory space in the application buffer into which information may be directly transferred. In operation 914 the external information source may begin (or resume) transferring information directly to the application buffer. The information transferred directly into the application buffer may be sequenced (e.g., may contain sequence numbers) to indicate that the information transferred to the NIC buffer precedes the information now being transferred directly to the application buffer.

While FIGS. 5, 7 and 9 illustrate various operations according to different embodiments, it is to be understood that not all of the operations depicted in FIGS. 5, 7 and 9 are necessary for other embodiments. Indeed, it is fully contemplated herein that in other embodiments of the present disclosure, the operations depicted in FIGS. 5, 7 and 9, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

The InfiniBand™ communications protocol may comply or be compatible with the InfiniBand specification published by the InfiniBand Trade Association (IBTA), titled "InfiniBand Architecture Specification", published in June, 2001, and/or later versions of this specification.

The iWARP communications protocol may comply or be compatible with the iWARP standard developed by the RDMA Consortium and maintained and published by the Internet Engineering Task Force (IETF), titled "RDMA over Transmission Control Protocol (TCP) standard", published in 2007 and/or later versions of this standard.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eM-MCs), secure digital input/output (SDIO) cards, magnetic or optical cards, or any type of media suitable for storing electronic instructions. Other embodiments may be implemented as software modules executed by a programmable control device.

The present disclosure provides systems and methods for remote direct memory access (RDMA) with reduced latency. RDMA allows information to be transferred directly between memory buffers in networked devices without the need for substantial processing. While RDMA requires registration/deregistration for buffers that are not already preregistered, RDMA with reduced latency transfers information to intermediate buffers during registration/deregistration, utilizing time that would have ordinarily been wasted waiting for these processes to complete, and reducing the amount of information to transfer while the source buffer is registered. In this way the RDMA transaction may be completed more quickly. RDMA with reduced latency may be employed to expedite various information transactions. For example, RDMA with reduced latency may be utilized to stream information within a device, or may be used to transfer information for an information source external to the device directly to an application buffer.

The following examples pertain to further embodiments. In one example embodiment there is provided a system. The system may comprise memory circuitry including a target buffer configured to at least receive information and intermediate buffers configured to receive and transmit information. The memory circuitry may also comprise a source buffer configured to cause information to be transferred to an intermediate buffer during registration of the source buffer. The source buffer may be further configured to cause additional information to be transferred directly to the target buffer after registration is complete.

The above example system may be further configured, wherein the source buffer is configured to cause the information to be transferred using Remote Data Memory Access (RDMA).

The above example system may be further configured, wherein being configured to cause information to be transferred to the intermediate buffer comprises the source buffer being further configured to cause blocks of information to be copied to a registration buffer while at least one of the amount of information copied is less than a registration offset or while the registration of the source buffer is not complete. In this example configuration the system may be further configured, wherein each block of information increases in size. In this example configuration the system may be further configured, wherein the registration buffer is configured to cause the blocks of information received from the source buffer to be transferred to the target buffer. In this example configuration the system may be further configured, wherein causing additional information to be transferred directly to the target buffer comprises the source buffer being further configured to cause the additional information to be transferred directly to the target buffer starting at an address in the source buffer based on the registration offset.

The above example system may be further configured, wherein the source buffer is further configured to cause information starting at a memory address based at least on a deregistration offset to be transferred to an intermediate buffer prior to deregistration of the source buffer. In this example configuration the system may be further configured, wherein causing information to be transferred to the intermediate buffer prior to deregistration comprises the source buffer being further configured to cause information to be copied to a deregistration buffer during the transfer of the additional information to the target buffer. In this example configuration the system may be further configured, wherein the deregistration buffer is configured to cause the information received from the source buffer to be transferred to the target buffer during deregistration of the source buffer. In this example configuration the system may be further configured, wherein causing the additional information to be transferred directly to the target buffer comprises the source buffer being further configured to transfer the additional information directly to the target buffer ending at a memory address based at least on the deregistration offset.

In another example embodiment there is provided a method. The method may initially comprise determining information to be transferred from a source buffer to a target buffer. The method may further comprise causing information to be transferred from the source buffer to an intermediate buffer during registration of the source buffer, and causing additional information to be transferred from the source buffer directly to the target buffer after registration is complete.

The above example method may be further configured, wherein the information is transferred via Remote Direct Memory Access (RDMA).

The above example method may be further configured, wherein causing information to be transferred from the source buffer to an intermediate buffer comprises causing information to be copied in blocks to a registration buffer while at least one of the amount of information transferred is less than a registration offset or while the registration of the source buffer is not complete. In this example configuration the method may be further configured, wherein each block of information increases in size. In this example configuration the method may further comprise causing the blocks of information received in the registration buffer to be transferred to the target buffer. In this example configuration the method may be further configured, wherein causing additional information to be transferred directly to the target buffer comprises causing the additional information to be transferred directly to the target buffer starting at an address in the source buffer based on the registration offset.

The above example method may further comprise causing information starting at a memory address based at least on a deregistration offset to be transferred to the intermediate buffer prior to deregistration of the source buffer. In this example configuration the method may be further configured, wherein causing information to be transferred to the intermediate buffer circuitry prior to deregistration comprises causing information to be copied to a deregistration buffer during the transfer of the additional information to the target buffer. In this example configuration the method may further comprise causing the information received in the deregistration buffer to be transferred to the target buffer during deregistration of the source buffer. In this example configuration the method may be further configured wherein transferring the additional information directly to the target buffer comprises causing the additional information ending at a memory address based at least on the deregistration offset to be transferred directly to the target buffer.

In another example embodiment there is provided a device configured to perform remote direct memory access, the device being arranged to perform any of the above example methods.

In another example embodiment there is provided a chipset arranged to perform any of the above example methods.

In another example embodiment there is provided at least one machine readable medium comprising a plurality of instructions that, in response to be being executed on a computing device, cause the computing device to carry out any of the above example methods.

In another example embodiment there is provided an apparatus for remote direct memory access with reduced latency, the apparatus being arranged to perform any of the above example methods.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system, comprising:
   memory circuitry including:
   an intermediate buffer to receive and transmit information; and
   a source buffer to cause information to be transferred to the intermediate buffer using Remote Direct Memory Access (RDMA) during asynchronous registration of the source buffer and before asynchronous registration has completed, and cause additional information to be transferred directly to a target buffer after asynchronous registration is complete.

2. The system of claim 1, wherein in causing information to be transferred to the intermediate buffer the source buffer is further to cause blocks of information to be copied to a registration buffer while at least one of the amount of information copied is less than a registration offset or while the asynchronous registration of the source buffer is not complete.

3. The system of claim 2, wherein each block of information increases in size.

4. The system of claim 2, wherein the registration buffer is to cause the blocks of information received from the source buffer to be transferred to the target buffer.

5. The system of claim 2, wherein in causing additional information to be transferred directly to the target buffer, the source buffer is further to cause the additional information to be transferred directly to the target buffer starting at an address in the source buffer based on the registration offset.

6. The system of claim 1, wherein the source buffer is further to cause information starting at a memory address based on at least a deregistration offset to be transferred to an intermediate buffer prior to deregistration of the source buffer.

7. The system of claim 6, wherein in causing information to be transferred to the intermediate buffer prior to deregistration the source buffer is further to cause information to be copied to a deregistration buffer during the transfer of the additional information to the target buffer.

8. The system of claim 6, wherein the deregistration buffer is to cause the information received from the source buffer to be transferred to the target buffer during deregistration of the source buffer.

9. The system of claim 6, wherein in causing the additional information to be transferred directly to the target buffer the source buffer is further to transfer the additional information directly to the target buffer ending at a memory address based on at least the deregistration offset.

10. A method, comprising:
    determining information to be transferred from a source buffer to a target buffer;
    causing information to be transferred from the source buffer to an intermediate buffer using Remote Direct Memory Access (RDMA) during asynchronous registration of the source buffer and before asynchronous registration has completed; and
    causing additional information to be transferred from the source buffer directly to the target buffer after asynchronous registration is complete.

11. The method of claim 10, wherein causing information to be transferred from the source buffer to an intermediate buffer comprises causing information to be copied in blocks to a registration buffer while at least one of the amount of information transferred is less than a registration offset or while the asynchronous registration of the source buffer is not complete.

12. The method of claim 11, wherein each block of information increases in size.

13. The method of claim 11, further comprising causing the blocks of information received in the registration buffer to be transferred to the target buffer.

14. The method of claim 11, wherein causing additional information to be transferred directly to the target buffer comprises causing the additional information to be transferred directly to the target buffer starting at an address in the source buffer based on the registration offset.

15. The method of claim 9, further comprising causing information starting at a memory address based on at least a deregistration offset to be transferred to the intermediate buffer prior to deregistration of the source buffer.

16. The method of claim 15, wherein causing information to be transferred to the intermediate buffer prior to deregistration comprises causing information to be copied to a deregistration buffer during the transfer of the additional information to the target buffer.

17. The method of claim 15, further comprising causing the information received in the deregistration buffer to be transferred to the target buffer during deregistration of the source buffer.

18. The method of claim 15, wherein transferring the additional information directly to the target buffer comprises causing the additional information ending at a memory address based on at least the deregistration offset to be transferred directly to the target buffer.

19. A system comprising at least one non-transitory machine-readable storage medium having stored thereon, individually or in combination, instructions that when executed by one or more processors result in the following operations comprising:
  determining information to be transferred from a source buffer to a target buffer;
  causing information to be transferred from the source buffer to an intermediate buffer using Remote Direct Memory Access (RDMA) during asynchronous registration of the source buffer and before asynchronous registration has completed;
  causing additional information to be transferred from the source buffer directly to the target buffer after asynchronous registration is complete.

20. The system of claim 19, wherein causing information to be transferred from the source buffer to an intermediate buffer comprises causing information to be copied in blocks to a registration buffer while at least one of the amount of information transferred is less than a registration offset or while the asynchronous registration of the source buffer is not complete.

21. The system of claim 20, wherein each block of information increases in size.

22. The system of claim 20, further comprising causing the blocks of information received in the registration buffer to be transferred to the target buffer.

23. The system of claim 20, wherein causing additional information to be transferred directly to the target buffer comprises causing the additional information to be transferred directly to the target buffer starting at an address in the source buffer based on the registration offset.

24. The system of claim 19, further comprising causing information starting at a memory address based on at least a deregistration offset to be transferred to the intermediate buffer prior to deregistration of the source buffer.

25. The system of claim 24, wherein causing information to be transferred to the intermediate buffer prior to deregistration comprises causing information to be copied to a deregistration buffer during the transfer of the additional information to the target buffer.

26. The system of claim 24, further comprising causing the information received in the deregistration buffer to be transferred to the target buffer during deregistration of the source buffer.

27. The system of claim 24, wherein transferring the additional information directly to the target buffer comprises causing the additional information ending at a memory address based on at least the deregistration offset to be transferred directly to the target buffer.

* * * * *